Oct. 28, 1930.  K. BAUMANN  1,779,417
ELASTIC FLUID TURBINE
Filed June 28, 1929   2 Sheets-Sheet 1

WITNESS
E. Lutz

INVENTOR
K. Baumann
BY
A. B. Reavis
ATTORNEY

Oct. 28, 1930.  K. BAUMANN  1,779,417
ELASTIC FLUID TURBINE
Filed June 28, 1929  2 Sheets-Sheet 2
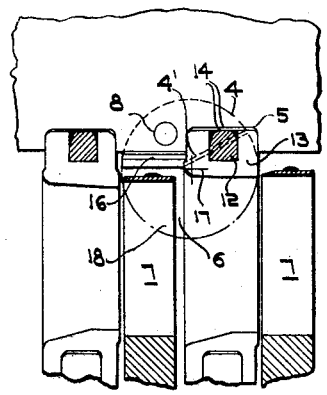
Fig.5.
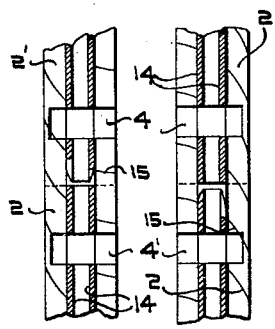
Fig.6.  Fig.7.
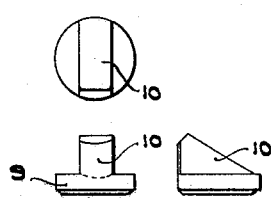
Fig.9.
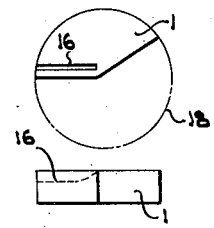
Fig.10.
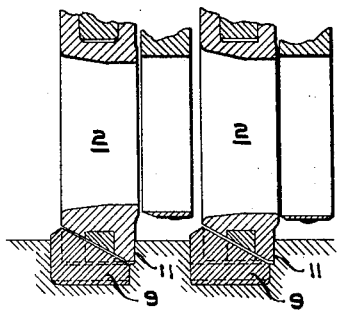
Fig.8.
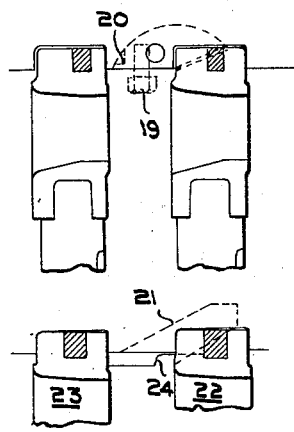
Fig.11.
Fig.12.
WITNESS
E. Lutz
INVENTOR
K. Baumann
BY
a. B. Reavis
ATTORNEY Patented Oct. 28, 1930

1,779,417

UNITED STATES PATENT OFFICE

KARL BAUMANN, OF URMSTON, ENGLAND, ASSIGNOR TO WESTINGHOUSE ELECTRIC & MANUFACTURING COMPANY, A CORPORATION OF PENNSYLVANIA

ELASTIC FLUID TURBINE

Application filed June 28, 1929, Serial No. 374,584, and in Great Britain July 5, 1928.

The invention relates to elastic fluid turbines and concerns particularly the arrangements for supporting the diaphragm members in the cylinders of turbines of the disc and diaphragm type.

It is the usual practice in the construction of steam turbines, for example of this type, to provide a slight circumferential clearance between the outer periphery of the diaphragm members and the grooves in the cylinders in which they are disposed, in order to admit of difference of expansion of the diaphragm members and the cylinder. The upper half of the diaphragm is usually supported in the upper half of the cylinder by means of stop plates or washers secured in recesses formed partially in the face of the longitudinal joint of the cylinder and extending beyond the cylinder wall so as to form a ledge or shoulder on which the diaphragm portion rests, while the lower half of the diaphragm sometimes rests directly upon the cylinder at the bottom, or stop plates are sometimes provided secured in recesses in the diaphragm or in the cylinder and providing projecting shoulder portions which are received in corresponding recesses in the cylinder or diaphragm respectively when the diaphragm is placed in position.

Although the above mentioned methods of supporting the diaphragm may be more or less satisfactory in cases where relatively low temperatures and pressures of the working fluid are in question, they may be subject to series disadvantages when higher temperatures and pressures are involved. The interference with the surface of the cylinder joint by the supports of the upper diaphragm member may occasion difficulties in preserving a fluid-tight joint and may encourage erosion thereat, while if the points of support for the lower half of the diaphragm are substantially displaced from the longitudinal joint, the whole or a considerable portion of the lower half of the diaphragm may expand upwardly with respect to the cylinder and the clearances at labyrinth glands between the diaphragm and rotor may be affected. It is not convenient to support the diaphragm members upon radial pins or studs passing through the wall of the cylinder as this would unduly weaken said wall and introduce further risk of leakage.

By the present invention these difficulties are overcome in a relatively simple manner and according thereto diaphragm supporting means is provided comprising a key member adapted to be inserted in a recess in the cylinder wall somewhat spaced from the longitudinal joint of the cylinder and to be moved into engagement with the recess in the diaphragm after positioning the latter in the cylinder, the movement of the key member into engaging position being transversely of the plane of the diaphragm. Preferably the recess in the cylinder wall is formed partly in the portion of the cylinder between two diaphragms and the key member is adapted to be inserted into engaging position or removed through this part of said recess. When in the engaging position the key member may be locked by a suitable locking device and may be again unlocked if it is desired to remove the diaphragm members from the cylinder.

The above and other objects are effected by my invention, as will be apparent from the following description and claims taken in connection with the accompanying drawings, forming a part of this application, in which:

Fig. 5 is an enlarged plan of a portion of the turbine at the horizontal joint, for example as indicated by line V—V of Fig. 1;

Figs. 6 and 7 are side views, on an enlarged scale, showing a portion of the diaphragm adjacent to the horizontal joint as seen when viewed from the directions indicated by arrows VI and VII in Fig. 1;

Fig. 8 represents, on an enlarged scale, a cross-section on line VIII—VIII of Fig. 1;

Fig. 9 shows plan, side and end views of a guide member which is employed as shown in Fig. 8;

Fig. 10 shows a plan and side elevation of a key member such as is employed in Fig. 5; and Figs. 11 and 12 are views substantially similar to Fig. 5, but showing modified forms which the key members may have.

Figure 1:
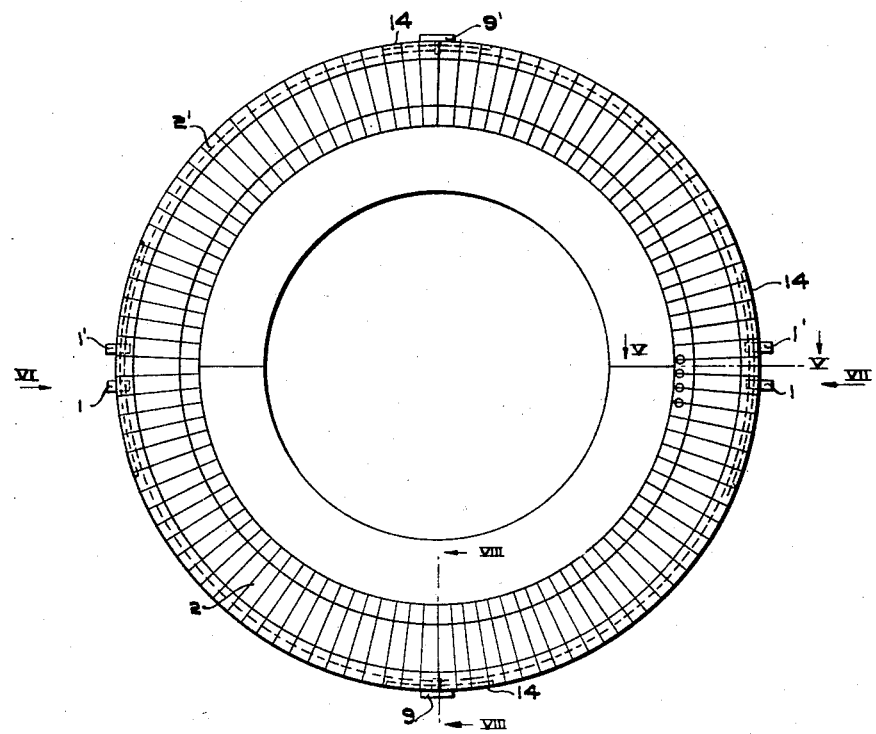
Fig. 1 is an elevation illustrating a built-up diaphragm having the invention applied thereto, this view being more or less diagrammatic.
Figure 2:
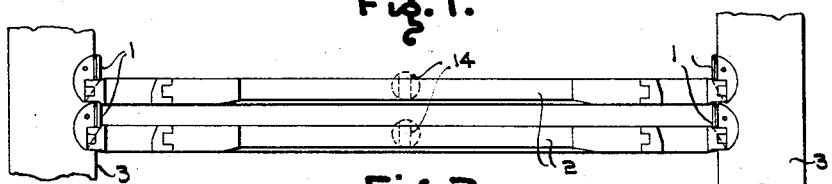
Fig. 2 is a plan corresponding to Fig. 1, and showing the lower halves of two adjacent diaphragms, the upper halves of the diaphragms being removed.

As may be more readily seen from Figs. 1 and 2, the invention consists essentially in the provision of key members 1, 1, and 1', 1' which are recessed partly in the lower and upper diaphragm portions 2, 2' and partly in the adjacent wall of the cylinder or casing 3 (Fig. 2), relatively close to the horizontal joint thereof. There is a small circumferential clearance between the periphery of the diaphragm and the cylinder wall, and it will be apparent that substantially all parts of both the lower half 2 of the diaphragm, the weight of which is supported by the keys 1, and the upper half 2' of the diaphragm, the weight of which is carried by the keys 1', are free to expand or contract radially with respect to the turbine axis, while at the same time the faces of the horizontal joint of the cylinder are not interfered with.

A suitable form of key member is shown more clearly in Fig. 10. It is substantially sector-shaped and the recess 4 in the cylinder wall (Fig. 5) into which said key member is to be fitted, is correspondingly of partly cylindrical form. The diaphragm is also formed with a wedge-shaped groove or recess 4' which registers with the recess 4 when the diaphragm is placed in position in the circumferential groove 5 in the cylinder wall. A sector-shaped recess is thus provided for the reception of the key 1, said recess opening into the space 6 between two adjacent diaphragms. Before the turbine rotor carrying the moving blade discs 7 is placed in position, the key members for supporting the diaphragms are inserted from the space 6 into their recesses 4 and rotated into position as indicated in Fig. 5.

The key 1 may be locked in position by means of a pin 8 passed through a hole bored in the joint face of the cylinder and into the key member. It will be observed that the pin 8 is disposed in the portion of the cylinder wall between two diaphragms and is nearer to the turbine axis than the grooves 5 which contain the diaphragms, so that the strength of the cylinder wall and the efficiency of the horizontal joint is not impaired.

To facilitate the positioning of the diaphragms in the casing, centering guide members 9, 9' are preferably provided at the bottom and top of the two halves of the cylinder (vide Fig. 1). These guide members are preferably constructed and arranged as shown in Figs. 8 and 9; they are formed with an upstanding web 10 of triangular shape, adapted to enter a corresponding groove in the diaphragm, as shown. It will be observed that neither the key members 1, nor the guide members 9 necessitate any interference with the face 11 of the diaphragm on the side of lower pressure, and therefore do not diminish the steam-tightness of the joint between said face and the contiguous surface of the groove 5.

In order to preserve the rigidity of the diaphragm in the case of built-up types of diaphragms circumferential lashing members are provided, disposed in grooves in the inner and outer periphery of the blade rings. The outer lashing members 12 (Figs. 5 to 8) of the diaphragm halves are preferably welded to the guide blade members 13 as indicated at 14, round the parts of the diaphragm where the grooves are formed for the reception of the keys 1 and 1' and the guide members 9. If desired the lashing members may be welded to the diaphragm over the whole of the circumference. The diaphragms are strengthened by the welding, it being observed from Fig. 5, that the grooves 4 and the key members 1 pass through a portion of the lashing member. It is also seen from Figs. 6 and 7 that one end of the lashing member 12 of each diaphragm half enters into the groove of the lashing member of the other diaphragm half at the joint 15 (indicated by cross-hatching).

If it is desired to remove one of the diaphragms 2, it is only necessary to remove the pins 8 of the key members 1 appertaining thereto and to withdraw the key members through the space 6, between two diaphragms, the turbine rotor naturally having been previously taken out. After removing the keys 1 the diaphragm portion may be lifted out.

Figures 3, 4:
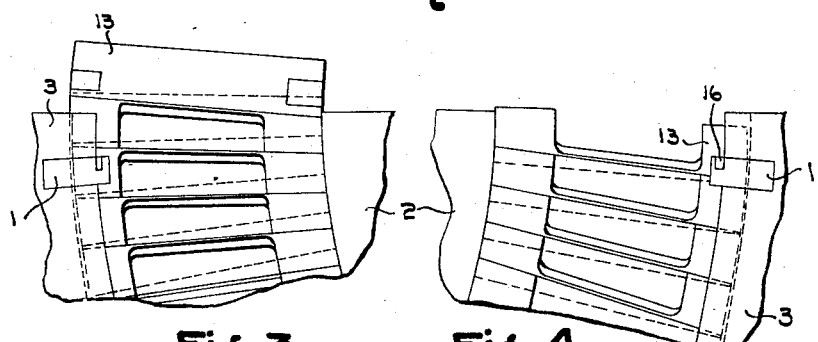
Figs. 3 and 4 show, on an enlarged scale, diametrically opposite portions of the lower half of the diaphragm adjacent to the horizontal joint; the views being elevations, with parts in section, as seen from the inlet side of the diaphragm.

To facilitate the removal of the keys 1, the latter may be formed with a groove 16 (Figs. 3, 5 and 10) into which a tool may be inserted for the purpose of applying an appropriate force to withdraw the key. The key is withdrawn by a rotary movement about the centre 17 (Fig. 5) of the circle 18 of which said key forms substantially a sector. A suitable tool for this purpose may for example be a crank lever having a nose adapted to engage the groove 16 and a spigot forming a fulcrum, the axis of which, when the tool is in use, is in vertical alignment with the centre 17. The spigot is inserted into an aperture in a fulcrum block formed as a saddle which is placed over the horizontal edge of the diaphragm half with said aperture coaxial with the centre 17. When the nose of the tool is engaged in the groove 16 of the key member and the spigot in the aperture of the fulcrum block, simple rotation of the tool about the centre 17 serves to remove the key member.

Other forms of key member and other arrangements for securing or withdrawing same are obviously possible within the scope of the invention. Two possible modifications are illustrated in Figs. 11 and 12 by way of example. In Fig. 11 a sector-shaped key member 1 is shown which when in position is completely recessed within the cylinder wall. The key 1 is formed with a tapped hole into which the forcing screw 19 may be inserted when it is desired to remove the key. The latter is formed with a lip 20, and when it has been started from its recess by the screw 19 so that the lip is exposed, the key may be levered out by inserting a tool behind the said lip.

Fig. 12 shows a modified form of key member 21 which may be placed in position engaging the diaphragm 22 by a linear movement transversely of the plane of the diaphragm instead of a rotary movement as in the example described above. With this construction the diaphragm 22 must be mounted and keyed in position before the adjacent diaphragm 23 is mounted in the cylinder. When the diaphragm 23 is placed in position however it serves to lock the key 21 and the latter cannot be withdrawn without first removing the diaphragm 23. The key 21 is formed with a projection 24 to facilitate its removal.

In a multi-stage turbine certain of the diaphragms may be mounted one after another and the key members locked in position in the manner described above with reference to Fig. 12, while the remaining diaphragms may be secured by key members of the other forms previously described above, or in any other manner as desired.

It will be understood that the key members and centering guides do not normally bear firmly upon the inner surfaces of the recesses which they engage in the diaphragms, but a small clearance is provided to permit freedom of expansion of the diaphragm.

From the foregoing it will be apparent that the invention provides a convenient method of mounting the diaphragm members in the cylinder so as to be free to expand without giving rise to difficulties in connection with the glands, without impairing the strength of the cylinder wall, and without necessitating interference with the surface of the longitudinal joint of the cylinder such as to reduce the effective area thereof. At the same time the invention does not introduce difficulties in assembling or dismantling the turbine but may rather tend to facilitate this work.

While it is generally preferred to dispose the recesses in the wall of the cylinder within an inch or so of the longitudinal joint, it may be possible in certain cases to dispose said recesses substantially spaced from said joint, care being taken to arrange the supporting surfaces of the portions of the key members which engage the diaphragm substantially radially with respect to the axis of the turbine.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

It is to be understood that the term "cylinder" is used in the turbine art as synonymous with casing, and that it does not necessarily imply a true cylindrical form.

What I claim is:

1. In a turbine, the combination of a cylinder divided along an axial plane, a diaphragm disposed in said cylinder, the cylinder wall and the diaphragm being formed with registering recesses spaced from the longitudinal joint of the cylinder, and a key member adapted to be inserted in the recess in the cylinder wall and to be moved into engagement with the recess in the diaphragm after positioning the diaphragm in the cylinder, the movement of the key member into engaging position being transversely of the plane of the diaphragm.

2. An elastic fluid turbine according to claim 1, wherein the recess in the cylinder wall is formed partly in the portion of the cylinder between two diaphragms and the key member is adapted to be inserted into engaging position or to be removed through this part of said recess.

3. An elastic fluid turbine according to claim 1, wherein locking means is provided to lock the key member when in engaging position.

4. An elastic fluid turbine according to claim 1, wherein the key member is adapted to be locked in engaging position by means of a pin or the like adapted to be passed through a bore in the cylinder from the horizontal joint thereof and through a corresponding aperture or recess in said key member, substantially as described.

5. An elastic fluid turbine according to claim 1, wherein a key member appertaining to one diaphragm is adapted to be locked in engaging position by an adjacent diaphragm.

6. An elastic fluid turbine according to claim 1, wherein the key member is substantially sector-shaped and is adapted to be moved into engaging position by a partial rotary movement, substantially as described.

7. An elastic fluid turbine according to claim 1, wherein the key member is formed with means facilitating removal thereof, substantially as described.

8. An elastic fluid turbine according to claim 1, wherein the supporting means for the diaphragm is shaped and arranged so as not to interrupt the face of the diaphragm which engages the cylinder on the side of the diaphragm of lower pressure, substantially as described.

9. An elastic fluid turbine according to claim 1, wherein the diaphragm is of the built-up type and a circumferential lashing member is welded around the periphery thereof adjacent the recess therein, said recess extending partly into the lashing member.

10. In a turbine, a casing having a circumferential groove formed therein, a diaphragm mounted in said groove, and means inserted laterally of the diaphragm and disposed between the casing and the diaphragm for positioning the diaphragm in the casing.

11. In a turbine, a casing divided along the horizontal plane of its axis, a diaphragm mounted in said casing, the casing and the diaphragm being formed with registering recesses spaced from the horizontal joint of the cylinder, and key members inserted in said recesses, said recesses being formed to permit insertion of the key members from the interior of the casing.

12. In a turbine, a casing divided along an axial plane and having a circumferential groove formed on the interior thereof, a blade-carrying stator having an annular peripheral portion mounted in said groove, said casing and said peripheral portion having registering recesses with sides extending substantially radially and spaced from the joint of the cylinder, the casing being imperforate at said recesses, and key members disposed in said recesses and maintaining the stator concentric with the casing.

13. In a turbine, a casing, a stator positioned axially in the casing by tongue and groove connection having radial clearance to permit radial expansion of the stator, registering recesses being formed in the casing and the stator, a key member extending into both recesses, one of the recesses opening laterally of the plane normal to the axis to permit insertion of the key member from the interior of the casing after the stator is in place.

In testimony whereof, I have hereunto subscribed my name this 10th day of June, 1929.

KARL BAUMANN.